(12) United States Patent  
Neureder

(10) Patent No.: US 8,061,693 B2  
(45) Date of Patent: Nov. 22, 2011

(54) ELASTIC BUSHING

(75) Inventor: Uwe Neureder, Leichlingen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/828,227

(22) Filed: Jun. 30, 2010

(65) Prior Publication Data

US 2010/0327501 A1    Dec. 30, 2010

(30) Foreign Application Priority Data

Jun. 30, 2009   (DE) .................. 10 2009 027 319

(51) Int. Cl.
*F16M 5/00* (2006.01)

(52) U.S. Cl. .................................. 267/140.12

(58) Field of Classification Search ............ 267/140.12, 267/219, 220; 280/124.155
See application file for complete search history.

(56) References Cited

U.S. PATENT DOCUMENTS

| | | | | |
|---|---|---|---|---|
| 5,042,785 | A | * | 8/1991 | LeFol et al. ............. 267/140.12 |
| 5,149,067 | A | * | 9/1992 | Fruhauf et al. ........... 267/140.13 |
| 5,205,545 | A | * | 4/1993 | Quast ...................... 267/140.13 |
| 5,342,029 | A | * | 8/1994 | Carter ........................... 267/220 |
| 5,704,598 | A | * | 1/1998 | Kojima ................... 267/140.13 |
| 6,666,439 | B2 | * | 12/2003 | Romer .......................... 267/220 |
| 6,908,076 | B2 | * | 6/2005 | Hayashi et al. ............... 267/220 |
| 6,988,718 | B1 | * | 1/2006 | Eulenbach et al. ............. 267/33 |

* cited by examiner

*Primary Examiner* — Christopher Schwartz  
(74) *Attorney, Agent, or Firm* — Joseph E Root

(57) ABSTRACT

The invention relates to an elastic bushing having an elastic element and a holding element for receiving the elastic element. The holding element having an abutment region is spaced apart from a counter-abutment region of the elastic element such that a gap is formed in a neutral position of the elastic bushing. The abutment region and the counter-abutment region are substantially spherical in shape to form the gap.

4 Claims, 6 Drawing Sheets

ELASTIC BUSHING

BACKGROUND

This application relates generally to mechanical connectors, and more particularly to connectors that absorb vibration.

An elastic bushing may be an integral part of an upper damper bearing or spring strut support bearing of a motor vehicle. The non-deflected state of the elastic bushing is the defined middle position in the state of static equilibrium, taking into account the gas force of the shock absorber or any other constant pre-load.

The following is a discussion of relevant art pertaining to elastic bushings. The discussion is provided only for understanding of the invention that follows. The summary is not an admission that any of the work described below is prior art to the claimed invention.

A European patent EP 0816140 B1 relates to a spring strut support bearing for wheel suspensions in a motor vehicle. The spring strut support bearing includes a vertically pot-shaped metallic housing; a rubber buffer arranged in the housing; a carrying piece, connectable to a damper, fixed to the rubber buffer through radially extending projections; an annular spring buffer supporting the upper end of a helical spring surrounding the damper; a radially directed housing flange forming a stay for the spring buffer; a cover plate, fastenable to a motor vehicle component, covering the rubber buffer and connected to the housing flange; and a one-piece metallic collar margin located on the underside of the housing and guides the damper radially. The housing is caulked with the cover plate. Recesses with a geometry changing in the circumferential direction, independently of the load, are provided in regions on the spring buffer side, which is supported by the housing flange.

Another German patent DE 19932868A1 discloses a spring strut including a spring plate, cooperating with one end of a piston rod, being arranged to be cardanically movable with respect to the piston rod. An elastic element provides this arrangement between the spring plate and the piston rod. For the upper spring strut support bearing, which may also be designated as a damper bushing, non-linearly progressive stiffness properties are required in the axial direction. On one hand, low stiffness is required in the event of a small deflection in order to improve the noise behavior (NVH=Noise Vibration Harshness). On the other hand, high stiffness is needed in case of a large deflection such that the damper forces can be absorbed without an excessive deflection occurring in the elastic bushing or in the damper bushing. It should be apparent that a balance between low and high stiffness should be achieved. Non-linear stiffness provides not only comfortable but agile driving and steering properties of a motor vehicle.

As used in this specification, the term "cardan joint," and its derivative modifiers "cardanic" and "cardanically," signify a joint that permits motion in any direction. The most widely-used example of such a joint to use referred to as a "universal joint," having two rotational axes close to one another, the axes oriented at 90° to one another. Universal joints are generally found on a rod or tube-like structure, such as the drive shaft of an automobile, providing the rod into two sections which may lie at any angle to one another. In the general case, cardanic joints simply permit movement in any direction.

Therefore, it would be highly desirable to have an improved damper bushing that increases driving comfort and eliminates the sensitivity of the bushing towards angular deflections.

SUMMARY

One embodiment of the present disclosure describes an elastic bushing including an elastic element and a holding element for receiving the elastic element. A substantially spherical-shaped abutment region of the elastic element is spaced apart from a substantially spherical-shaped counter-abutment region of the holder element forming a gap in neutral position. The spherical profile of the abutment region and the counter-abutment region are identically oriented to maintain a substantial gap in case of angular deflection from the neutral position.

The present disclosure improves a damper bushing by simple and efficient means mitigating the disadvantages of the known damper bushings.

The object is achieved, according to the present disclosure, by utilizing an elastic bushing having at least the abutment region of the holding element or the counter-abutment region of the elastic element being designed with a substantially spherical profile. This results in formation of a circularly shaped gap between the two regions.

In one embodiment of the present disclosure, the abutment region and the counter-abutment region have identically oriented curvatures, which are curved outwardly (convexly) with respect to a horizontal axis.

The gap between the abutment region and the counter-abutment region is uniform when the damper bushing is in the neutral position. It may be understood that the four gaps may not be of equal size in the cardanically non-deflected state. It is, however, required that the gap does not change substantially in the cardanic deflection state. The gap has a resultant (circular) centerline having its center lying on a mid-axis of the elastic element. The elastic center of the damper bushing also lies on this mid-axis. Ideally, the radius of the (circular) centerline is so dimensioned that the circle center point coincides with the elastic center of the damper bushing. When the damper bushing is rotated or tilted from its neutral position, the gap remains constant. Because of restrictions in design space, however, this expedient refinement is not always achievable, and the radius of the gap may be appropriately selected so that the axial distance between the circle center point of the gap and the center of the damper bushing is substantially small. Since, a radius larger than the ideal radius of the gap still improves the robustness of progression counters to cardanic movements as compared with a configuration of the abutment and counter-abutment regions with a rectilinear profile.

The embodiments of the present disclosure describe the abutment region and the counter-abutment region being curved or formed convexly with the same orientation so that a damper bushing's characteristics are insensitive to tilting movements or cardanic movement is made available. In the event of a tilting movement or cardanic movement from the neutral position, a relatively early punctiform bearing of the free edge of the abutment region against the counter-abutment region is avoided.

In an embodiment of the present disclosure, the damper element is designed as in the prior art, but with a convex configuration of the abutment and the counter-abutment regions. The elastic element may be designed as a rubber element and is sufficiently connected to U-legs and to an outward portion of the flange with respect to the mid-axis.

In another embodiment of the present disclosure, the holding element includes upper and lower elements, designed so that an ellipse-like inner space is formed when the two elements are connected. The upper and lower elements include abutment regions that are designed as a flange with a convex shape. The flanges oriented toward one another are spaced apart forming an engagement orifice at their edges through which the damper piston rod can be introduced. The elastic element is positioned in the inner space having a counter-abutment region, corresponding to the abutment region, designed with a convex shape forming a gap between the two regions. A fastening element, connected to the elastic element, extends transversely through the inner space such that the lateral fastening regions of the fastening element are surrounded by the elastic element or are fastened therein. The fastening element fastens the piston rod of the damper or the damper piston rod.

This embodiment of the present disclosure designs the abutment region and the corresponding counter-abutment region in a convex shape with respect to a horizontal centerline, to generate a circularly shaped gap having a radius such that its circle center point is substantially close to the elastic center of the damper bushing.

It should be apparent to those skilled in the art that the spherically designed abutment regions and the corresponding spherical-shaped counter-abutment regions discussed in the present disclosure may be applied to any damper bushing to obtain uniform or predominantly uniform spring characteristics or progression, as a certain linear region is available in the event of cardanic deflection. Further, the damper bushing may be suitable for use as an upper damper or spring strut support bearing of a wheel suspension of a motor vehicle.

BRIEF DESCRIPTION OF THE DRAWINGS

The drawing figures described below set out and illustrate a number of exemplary embodiments of the disclosure. Throughout the drawings, like reference numerals refer to identical or functionally similar elements. The drawings are illustrative in nature and are not drawn to scale.

DETAILED DESCRIPTION

The following detailed description is made with reference to the figures. Exemplary embodiments are described to illustrate the subject matter of the disclosure, not to limit its scope, which is defined by the appended claims.

Figure 1:
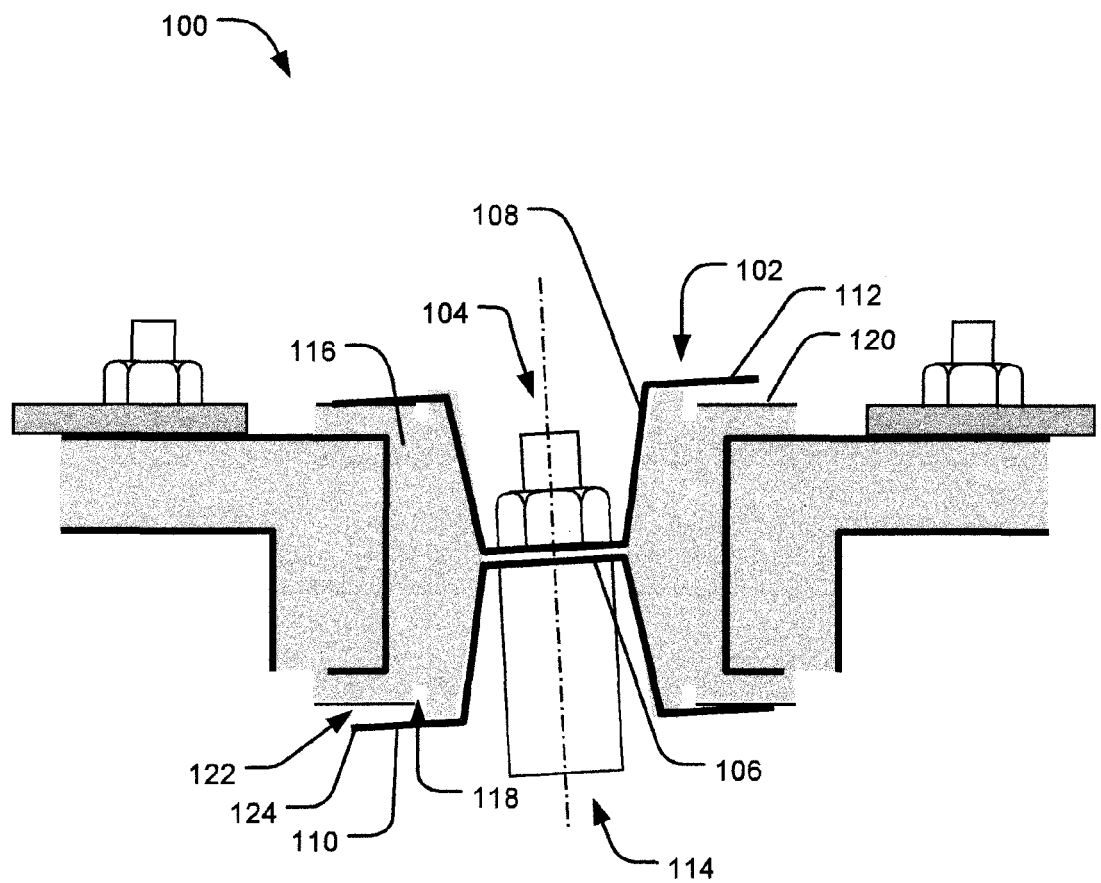
FIG. 1 illustrates an embodiment of a conventional damper bushing known in the prior art, in an angularly deflected position.

In general, an almost rotationally symmetrical damper bushing is conventionally implemented as illustrated in FIG. 1. The progressive stiffness is achieved by means of a holding element 102, which may be configured in the form of a metallic plate. The holding element 102 has a substantially U-shaped basic body 104 that has a base web 106 and U-legs 108. The U-legs 108 have adjoining contra-directionally oriented flanges 110; each flange 110 includes at least a portion of an abutment region 112. As shown, the holding element 102 consists of the two basic bodies 104 that lie back to back with their respective base web, so that an open reception region 114 is formed. An elastic element 116 is arranged on the outer surface of the holding element 102, extending outwardly with respect to a mid-axis and bears partially against the flanges 110. Towards each flange, the elastic element 116 has a groove or a radial groove 118 having a step on its side oriented away from the mid-axis such that a counter-abutment region 120 is formed. To that end, the elastic element 116 is designed with a smaller diameter in the counter-abutment region 120 than on the side of the groove that is oriented toward the mid-axis. The abutment region 112 is spaced apart from the counter-abutment region 120 by a gap 122. As can be seen clearly in FIG. 1, both the abutment region 112 and the counter-abutment region 120 are planar in design. In case the bushing 100 is deflected by a specific amount, for example under the action of the damper force, the abutment region 112 makes contact with the counter-abutment surface 120. In such a situation, the abutment region 112 and the counter-abutment region 120 can be considered as limit stops, though with finite stiffness, which generate the desired progressive stiffness or spring characteristic.

The axial stiffness properties of the bushing 100 vary with the tilting movement in the drawing plane or perpendicular thereto. The damper bushings 100 are sensitive to angular movements or cardanic movements. Such deviations from the ideal position, for example when the piston rod axis is not parallel to the bushing axis, are possible not only because of body, but also chassis and wheel suspension tolerances or wheel suspension kinematics. Such a state is illustrated by way of example in FIG. 1. As shown, the abutment region 112 is rotated angularly from the horizontally oriented position such that the free edge 124 of the abutment region 112 is oriented in the direction of the counter-abutment region 120. Consequently, the abutment region 112 makes contact with the counter-abutment region 120 instantly, varying the stiffness or spring properties of the bushing 100. The variation in the stiffness or spring properties during angular deflections consequently effects the driving comfort and vehicle reactions. As a result, the known system is extremely sensitive to deviations arising, for example, because of the kinematics of the (wheel) suspension or body tolerances.

Figure 2:
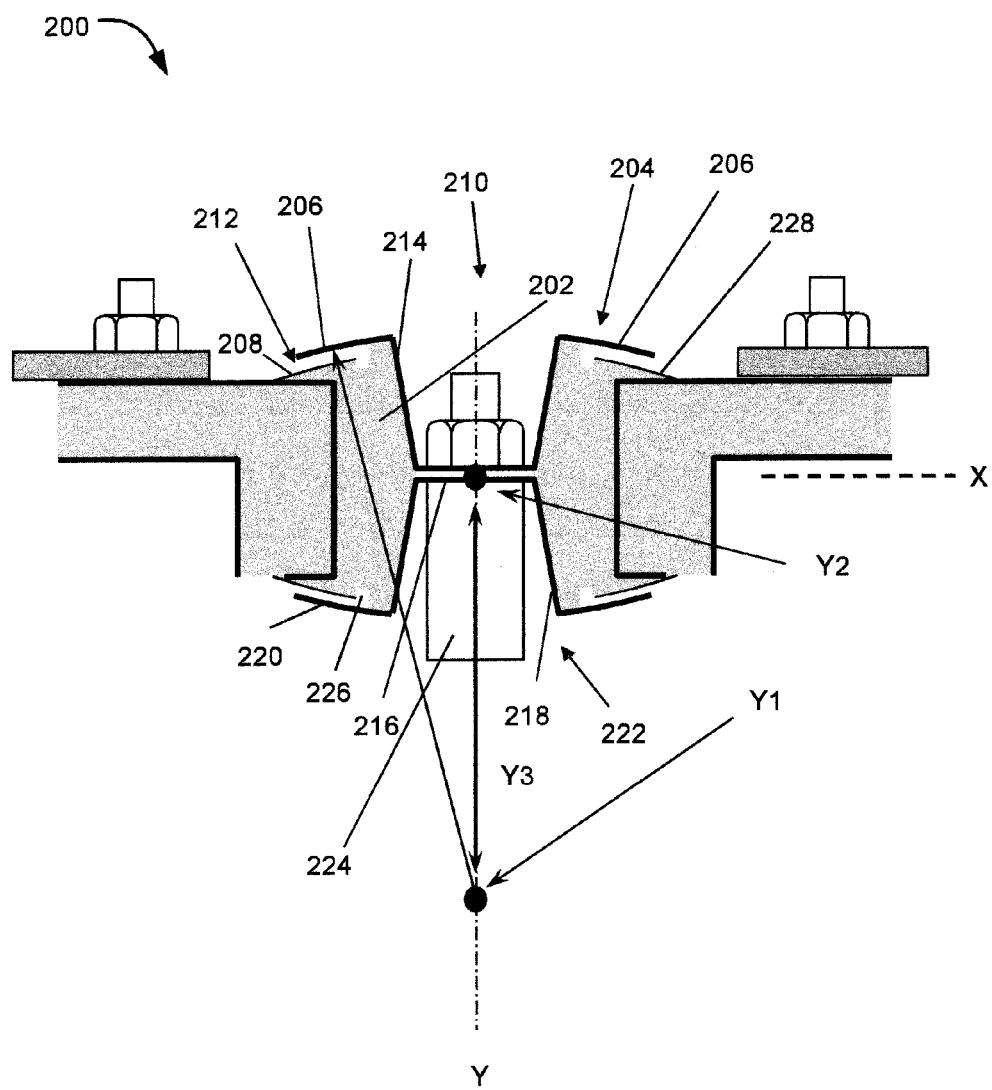
FIG. 2 illustrates an exemplary embodiment of a damper bushing in a neutral position.

FIG. 2 illustrates an exemplary embodiment of an elastic bushing 200, also referred to as a damper bushing, including an elastic element 202 and a holding element 204 receiving the elastic element 202. The holding element 204 has an abutment region 206, which is spaced apart from a corresponding counter-abutment region 208 of the elastic element 202 such that in a neutral position 210, that is, a substantially non-deflected state of the elastic bushing 200, a gap 212 with considerably uniform profile is formed. As shown, the gaps 212 may not be of the same size in the cardanically non-deflected state; however, the gap 212 does not vary considerably under cardanic deflection. The abutment region 206 of the holding element 204 and the counter-abutment region 208 of the elastic element 202 are designed with a spherical profile having an outward curvature or convex profile with respect to a horizontal centerline X.

The holding element 204 has an essentially U-shaped basic body 214, which includes a base web 216 and U-legs 218. The U-legs 218 include adjoining contra-directionally oriented flanges 220 including at least a portion of the abutment region 206. As shown, the holding element 204 consists of two basic bodies 214 that lie back to back with their respective base web 216 to form an open reception region 222. A damper piston rod 224 of a spring strut may be fastened in this reception region 222, for example. The elastic element 202, manufactured from, but not limited to, a rubber element, is arranged outwardly on the holding element 204 with respect to a vertical mid-axis Y, and bears partially against the respective flanges 220. The elastic element 202 has a groove 226 having a step oriented away from the vertical mid-axis Y to form the corresponding counter-abutment region 208. In an embodiment of the bushing 200, the groove 226 may be radial in shape.

The elastic element 202 is designed with a smaller diameter in the counter-abutment region 208 than on the side of the groove 226 that is oriented toward the mid-axis Y. The abutment region 206 is spaced apart from the corresponding counter-abutment region 208 by means of the gap 212. The holding element 204 is designed, for example, as a metallic plate, while the two basic bodies 214 may manufactured as a single piece. On the counter-abutment region 208, a subsidiary line 228 increases the contrast of the rubber or elastic element 202 such that the spherical contour of the rubber abutment 206 becomes substantially visible. It should be apparent that the radial groove 226 is not a structural feature having a restricting effect, but is conducive to stress distribution in the rubber or elastic element 202.

The curvatures of the abutment region 206 and the respective counter-abutment region 208 are identically oriented, having similar radii. This structure creates a circular gap profile, with a centerline, having the center point Y1 substantially coinciding with the vertical mid-axis Y. Moreover, the elastic center Y2 of the damper bushing 200 lies on the vertical mid-axis Y. The radius of the circular-shaped gap 212 may be suitably selected so that an axial distance (arrow Y3) between Y1 and Y2 is substantially small. In one embodiment of the bushing 200, Y1 and Y2 may converge. Additional known components of the spring strut, such as the spring plate and helical spring, are not illustrated in the FIG. 2 to clearly represent spherical shape of the abutment region 206 and the counter-abutment region 208.

As shown in FIG. 1, conventionally both the abutment region 112 and the counter-abutment region 120 are of rectilinear or planar design. Once the bushing 100 is deflected by a defined amount, for example by the damper force, the abutment region 112 makes contact with the counter-abutment surface or the counter-abutment region 120. As a result, the abutment region 112 and the counter-abutment region 120 may be considered as limit stops that add a significant amount of stiffness such that the required progressive stiffness or spring curve, described in the following section in connection with FIG. 5, can be achieved. The conventional damper bushings 100 shown in FIG. 1 may experience varying axial stiffness properties with a tilting movement in the drawing plane or perpendicularly thereto. Consequently, the damper bushings 100 are sensitive to angular movements or cardanic movements. Such deviations from the original position may depend on, but not limited to, the body, chassis and wheel suspension tolerances, or the wheel suspension kinematics. As shown in FIG. 1, the abutment region 112 is rotated angularly from the horizontally oriented position towards the counter-abutment region 120, resulting in exposing the abutment region 112 to the counter-abutment region 120 prematurely. Consequently, the insulation and damping properties of the "damper with damper bushing" system, and therefore the driving comfort and vehicle reactions during angular deflection are also varied directly, in total, for the worse. As a result, the conventional system is substantially sensitive to deviations introduced by kinematics of the suspension or manufacturing tolerances.

Figure 3:
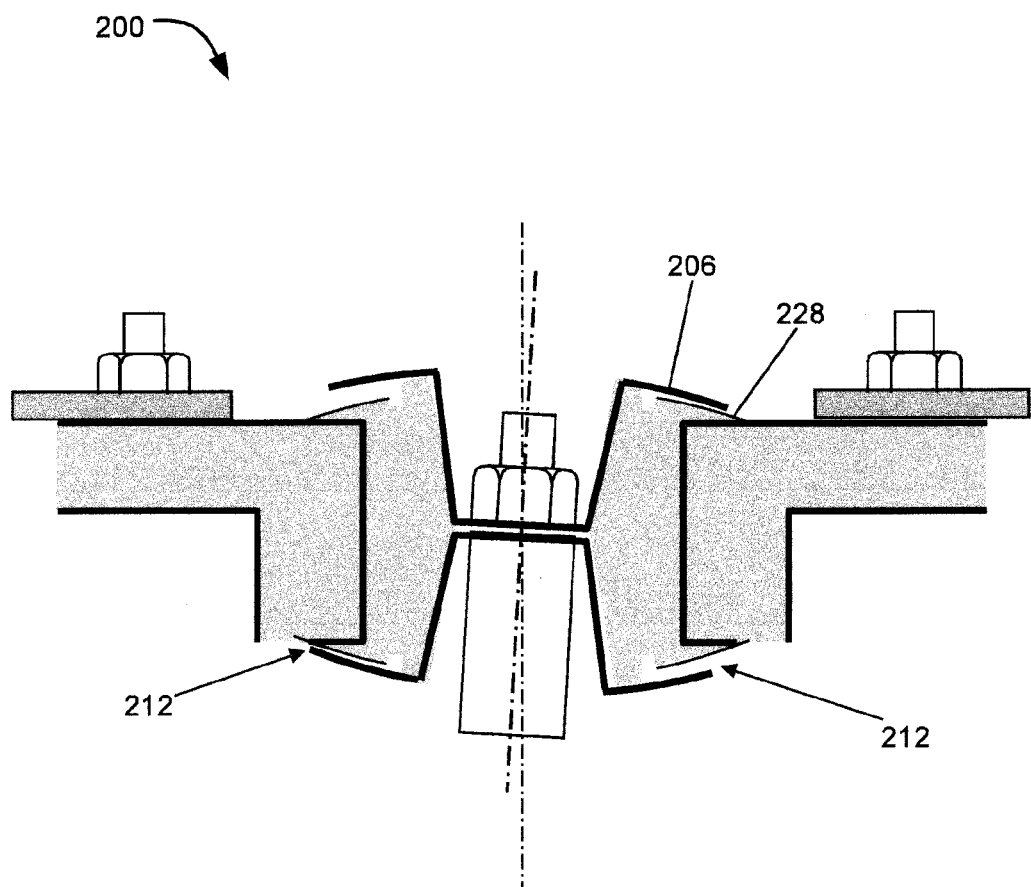
FIG. 3 illustrates the exemplary embodiment of the damper bushing, shown in FIG. 2, in an angularly deflected position.

To overcome these issues, the present disclosure employs the abutment region 206 and counter-abutment region 208 designed with spherical configurations. FIG. 3 illustrates the damper bushing 200 tilted away from the neutral position. As clearly shown in bottom left and top right of FIG. 3, the abutment region 206 is always substantially spaced apart from the corresponding counter-abutment region 208. The bushing 200 continuously maintains a gap between the two regions. Also, the gap between obliquely opposite sides remains substantially large. In case dimension Y3 is zero, the bushing is completely insensitive to angular deflection.

Figure 4:
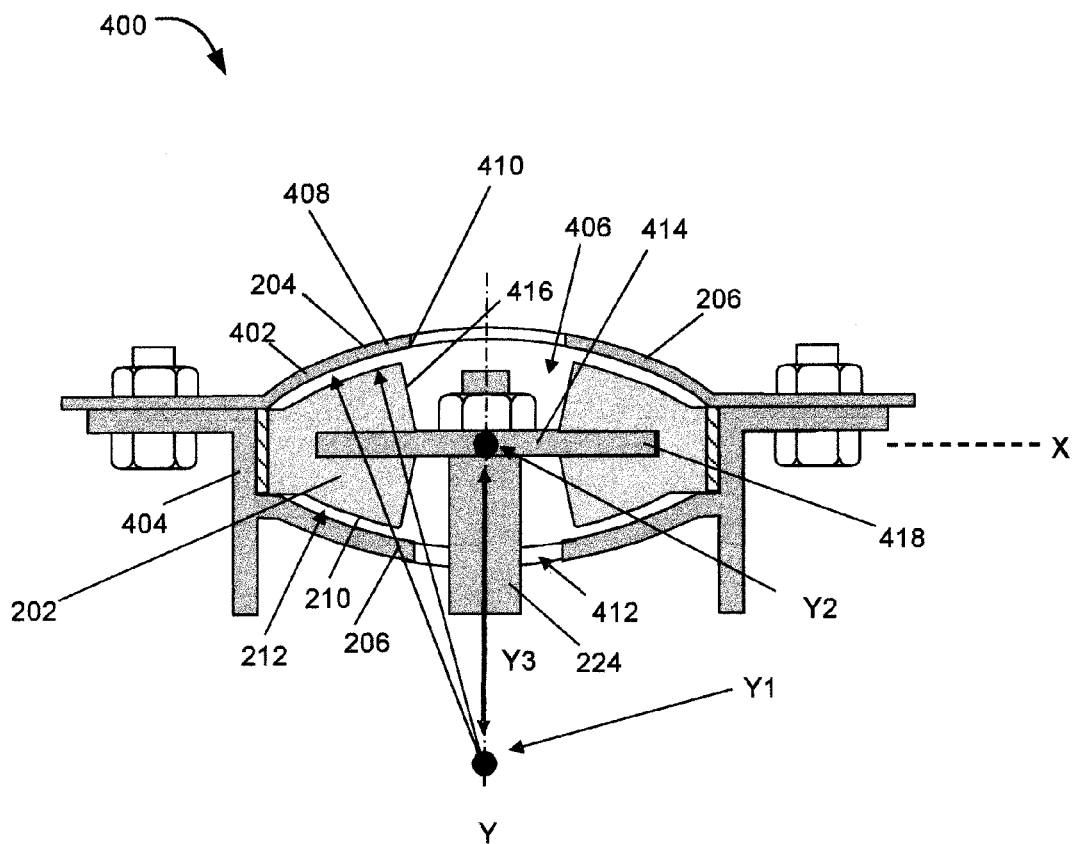
FIG. 4 illustrates the arrangement of the damper bushing shown in FIG. 2.

FIG. 4 illustrates an embodiment of the damper bushing 200 in an automotive suspension system. As shown, the holding element 204 includes an upper element 402 and a lower element 404 designed such that an ellipse-like inner space 406 is formed when the two elements 402 and 404 are connected to form an ellipse-like housing. The two elements 402 and 404 are substantially spherical in shape. Each upper and lower element 402 and 404 comprise of appropriately designed abutment region 206 that is convexly shaped in the form of a flange 408. The flanges 408, oriented towards one another, having edges 410 are spaced apart to form an engagement orifice 412 through which the damper piston rod 224 can be introduced.

The elastic element 202, arranged in the inner space 406, includes the counter-abutment regions 208 corresponding to the abutment regions 206. To match the profile of the abutment region 206, the convex design of counter-abutment region 208 creates gap 212 between the two regions. Further, a fastening element 414 connects to the elastic element 202, and extends transversely through the inner space 406 such that the lateral fastening regions of the fastening element 414 are surrounded by the elastic element 202 or are fastened therein. The fastening element 414 fastens the damper piston rod 224.

The free end edges 416 of the elastic element 202 are oriented in the direction of the mid-axis Y, and are spaced apart from the axis. Moreover, the end edges 416 may be obliquely oriented from the vertical mid-axis Y at an inclination in the direction of the abutment region 206 with respect to the horizontal mid-axis X. The lower element 404 fastens the fastening end 418 of the elastic element 202. The fastening end 418 is designed cylindrically, and merges substantially into the spherically designed counter-abutment region 208. As shown, the elastic center Y2 of the elastic bushing 200 and the circle center point Y1 substantially lie on the mid-axis Y, and the radius of the circularly-shaped gap 212 should be appropriately selected such that the distance Y3 is significantly low.

As shown, four gaps 212 are formed, two on either side of the mid-axis Y. The gap 212 along the abutment regions 206 and the corresponding counter-abutment regions 208 (FIG. 2) are continuous in the circumferential direction. It may be contemplated that the gap 212 may not be continuous in some embodiments of the present disclosure.

Figure 5:
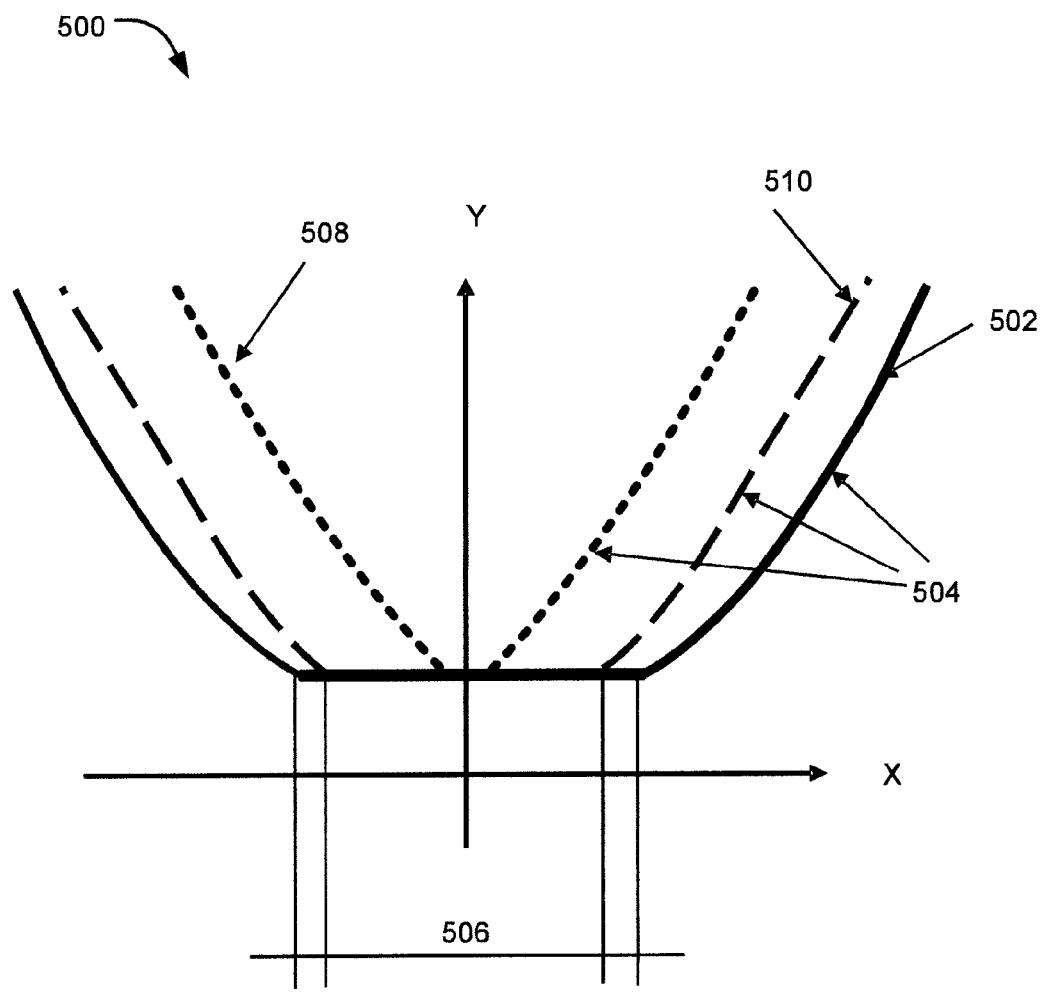
FIG. 5 is a graph depicting characteristics of the damper bushing employed in the present disclosure.

FIG. 5 illustrates characteristics of the damper bushing 200 in a cardanic deflection state, in which the X-axis designates axial deflection and the Y-axis designates stiffness. As shown, curve 502 depicts the axial stiffness of the elastic bushing 200 and the conventional bushing in the cardanically non-deflected state. The curve 502 merges into a progression 504 via a linear region 506. The curve 508 represents axial stiffness of the conventional bushing (as shown in FIG. 1) in the cardanically deflected state, where the progression 504 acts directly. As discussed, the angular deflection of the abutment region exposes the abutment region to the counter-abutment region prematurely, resulting in varying the stiffness or spring properties of the bushing. The curve 508 describes the scenario where the linear region 506 is reduced and the progression 504 commences earlier as compared to the non-deflected state.

The curve 510 illustrates axial stiffness in the cardinally deflected state of the elastic bushing 200. It should be apparent that the characteristic curve should not vary under cardanic deflection. It can be seen that the specific linear region 506 is almost maintained before the action of the progression 504.

As shown in curve 510, illustrating the damper bushing of the present disclosure, in case of a tilting or cardanic movement from the neutral position the linear region 506 is substantially maintained as compared to conventional damper (curve 508) such that the progression 504 remains substantially unchanged in comparison with the cardanically non-deflected state. Further, the progression 504 during angular deflection does not commence prematurely.

Figure 6:
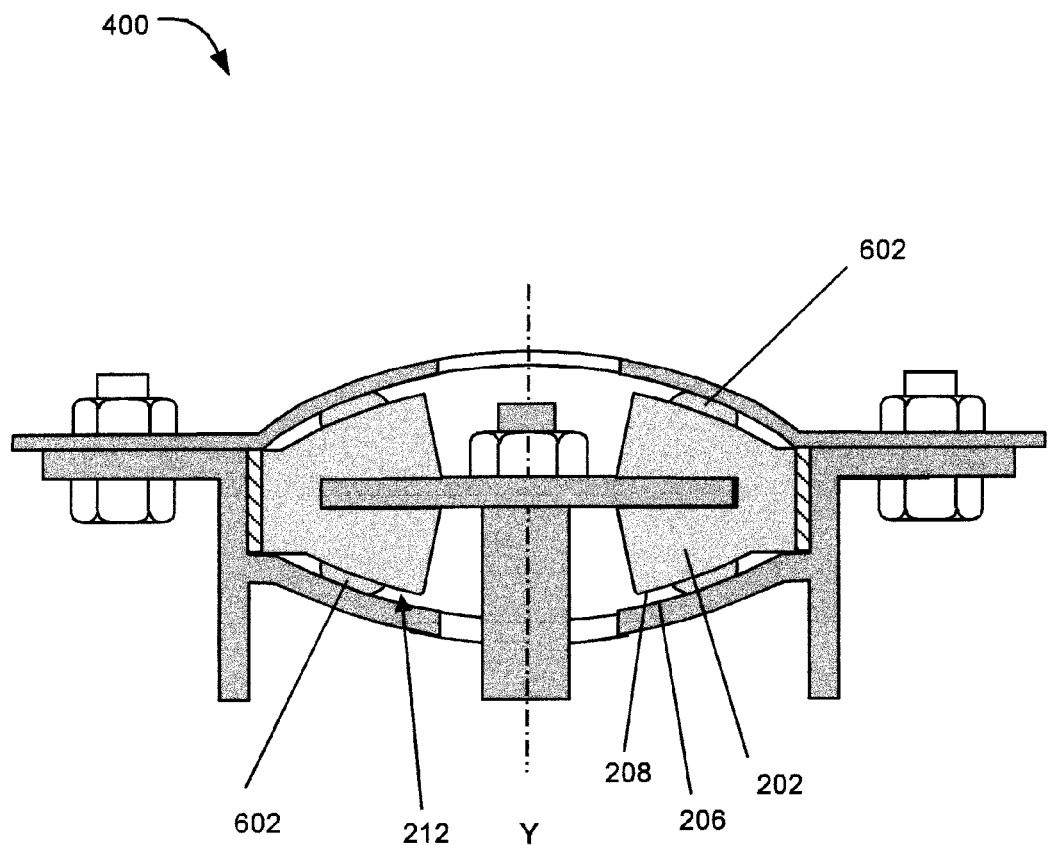
FIG. 6 illustrates the embodiment of the damper bushing, shown in FIG. 4, with exemplary thickenings.

Further, the linear stiffness properties of the elastic bushing may be achieved by eliminating the gap between the two regions in some sections. FIG. 6 illustrates an alternate embodiment of the damper bushing 200, shown in FIG. 4, including thickenings 602 that extend from the spherical surface of the counter-abutment region 208 in the direction of the abutment region 206. In some implementations, the thickenings 602 may bear against the abutment region 206. The thickenings 602 are substantially circular in shape, and may be cut in a secant-like manner, for example. Although, the progression may be generated because of overcoming the residual gap, but the structure of the elastic bushing 200 discussed in the present disclosure is insensitive to cardanic deflection due to the spherical shape of the abutment region 206 and the counter-abutment region 208.

Those skilled in the art will understand that the steps set out in the discussion above may be combined or altered in specific adaptations of the disclosure. The illustrated steps are set out to explain the embodiment shown, and it should be anticipated that ongoing technological development would change the manner in which particular functions are performed. These depictions do not limit the scope of the disclosure, which is determined solely by reference to the appended claims.

The specification has set out a number of specific exemplary embodiments, but those skilled in the art will understand that variations in these embodiments will naturally occur in the course of embodying the subject matter of the disclosure in specific implementations and environments. For example, some other detectors than the RF detectors may be used. It will further be understood that such variation and others as well, fall within the scope of the disclosure. Neither those possible variations nor the specific examples set above are set out to limit the scope of the disclosure. Rather, the scope of claimed invention is defined solely by the claims set out below.

What is claimed is:

1. An elastic bushing comprising:
   an elastic element;
   a holding element for receiving the elastic element;
   a substantially spherical-shaped abutment region of the holding element; and
   a substantially spherical-shaped counter-abutment region of the elastic element, having a radius similar to the radius of the abutment region;
   wherein, a gap exists between the abutment region and the counter-abutment region in both a neutral position of the elastic bushing and during angular deflection of the bushing.

2. The elastic bushing of claim 1, wherein the spherical profile of the abutment region and the counter-abutment region are identically oriented.

3. The elastic bushing of claim 1, wherein the abutment region and the counter-abutment region are curved outwardly with respect to a horizontal axis.

4. The elastic bushing of claim 1, wherein the gap has a circular profile corresponding to the configuration of the abutment region and the counter-abutment region.

* * * * *